United States Patent Office 2,865,941
Patented Dec. 23, 1958

2,865,941

CHLORO-DIENYL XANTHATES

John J. D'Amico, Charleston, W. Va., assignor to Monsanto Chemical Company, St. Louis, Mo., a corporation of Delaware No Drawing. Application June 20, 1955
Serial No. 516,771

4 Claims. (Cl. 260—455)

The present invention relates to new compositions of matter of the chemical grouping of products describable as chlorodienyl xanthates. More specifically, the invention is directed to compositions of the type X—Y where X represents a xanthic acid radical, said radical containing one from a group consisting of alkyl and cyclic groups and where Y represents a diene group, said group containing one chlorine atom and from four to six carbon atoms, of which said carbon atoms four are joined by means of two double bonds.

The products of the new class as set forth and claimed hereinafter in more detail are readily produced by reacting a dichlor-hexadiene with the alkali metal salt of a xanthate. A wide variety of xanthates are susceptible of reaction in the manner shown, as for example the sodium or potassium (or other metal salts, preferably those which are soluble in water) salts of methyl xanthic acid, ethyl xanthic acid, amyl xanthic acid, isopropyl xanthic acid, secondary butyl xanthic acid, tetrahydrofurfuryl xanthic acid, allyl xanthic acid, tert-butyl thioethyl xanthic acid, cyclohexyl methyl xanthic acid, hydroxy-ethoxy ethyl xanthic acid, diethyl-aminoethyl xanthic acid, morpholinyl ethyl xanthic acid, and others. Likewise several dienes in the form of dihalogen derivatives are capable of use in reaction with a metallic xanthate. Such dienes are for example the dichlorides or dibromides of butadiene, isoprene, methyl isoprene, pentadiene and hexadiene.

Details of the preferred process of manufacturing the new compositions are set forth in the following typical examples.

*Example 1*

Sodium ethyl xanthate was prepared in the well known manner and 158.4 parts (1.1 moles) were added together with 1000 parts of water to a jacketed vessel equipped with a stirrer, a recording thermometer and a reflux condenser. With cooling means flowing through the jacket, 151.1 parts (1.0 mole) of 1,3-dichloro-2,4-hexadiene were added and the mixture agitated for substantially 24 hours. The temperature of the mass was held at not more than 10–15° above room temperature by the cooling medium. At the end of the time period metioned, the reaction was substantially completed and the mixture was then extracted with about 500 parts of ether. The ethereal solution was then washed several times with water until the water washings reacted neutral to litmus paper, whereupon the ether solution was dried by agitating with anhydrous sodium sulfate and the ether was then removed in vacuum. The product was an amber colored oil, obtained in substantially 90% theory yield, was insoluble in hot and cold water but soluble in ether, acetone, chloroform, benzene, heptane, ethyl alcohol and ethyl acetate. Analysis of the product yielded the following results: Sulfur 26.90%, chlorine 14.49% as compared with theory content respectively of 27.08% and 14.97%.

The reaction whereby the product 3-chloro-2,4-hexadienyl ethyl xanthate is formed is set forth as follows:

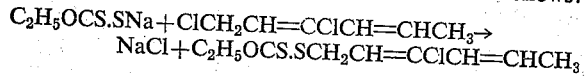

*Example 2*

Employing as a charge, a mixture of 95.8 parts (0.55 mole) of potassium isopropyl xanthate in 500 parts of water and 75.6 parts (0.5 mole) of 1,3-dichloro-2,4-hexadiene and proceeding in the equipment and by the procedure described in Example 1, there was obtained 3-chloro-2,4-hexadienyl isopropyl xanthate as an amber colored oil in 83.7% theory yield. Analysis for sulfur content resulted in 25.01% found compared with 25.57% theory. The product, named above, possesses the formula $(CH_3)_2CHOCS.SCH_2CH=CClCH=CHCH_3$. It possesses the same solubility characteristics as the product shown in Example 1.

*Example 3*

Following the procedure described in Example 2, but substituting 103.5 parts (0.55 mole) of potassium sec-butyl xanthate for the isopropyl xanthate there employed, there was obtained 3-chloro-2,4-hexadienyl sec-butyl xanthate as an amber colored oil in 76.3% theory yield. Analysis of the product showed 23.86% sulfur content as compared with 24.21% theory for the above named product of the formula

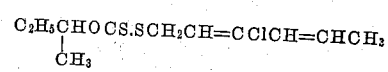

The product of this example exhibits the same solubility characteristics as the product in Example 1. Although ether was employed as the extractant in the examples set forth, it is, of course, possible to employ any of the solvents shown for the products, which solvents themselves are not miscible with water. Furthermore, it is entirely feasible to produce more effective wetting and consequently more rapid solution of the xanthate in the water charged by employing a small amount, for example 0.01% by weight of a suitable wetting agent such as decyl benzene sodium sulfonate.

The products of the present invention are adaptable for many practical uses such for example as herbicides, fungicides and lubricating oil additives. For example, the products described in Examples 1, 2 and 3 herein were tested in dosage of 5% by weight in a lubricating oil base stock in S. A. E. load and wear tests by following the procedure of the well known S. A. E. extreme pressure lubricant test. This test and the machine employed therefor is described in detail in U. S. Patent 2,628,939 of February 17, 1953 to E. S. Blake. The three products shown herein all successfully passed the test described.

It is intended to cover all changes and modifications of the examples of the invention herein chosen for purposes of disclosure which do not constitute departures from the spirit and scope of the invention.

What is claimed is:

1. A chloro-dienyl xanthate of the general formula X—Y where X represents an alkyl xanthate radical, said alkyl group selected from a member of a group consisting of methyl, ethyl, propyl, butyl, amyl group and where Y represents a monochlor hexadiene nucleus.

2. A monochlor hexadienyl alkyl xanthate said alkyl group containing less than 6 carbon atoms.

3. A monochlor hexadienyl isopropyl xanthate.

4. 3-chloro-2,4-hexadienyl ethyl xanthate.

No references cited.